May 31, 1932.  M. TIBBETTS  1,860,636

CLUTCH OPERATING MECHANISM

Filed March 30, 1928

Inventor

Milton Tibbetts

Patented May 31, 1932

1,860,636

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

CLUTCH OPERATING MECHANISM

Application filed March 30, 1928. Serial No. 265,997.

This invention relates to motor vehicles and more particularly to the clutch thereof.

The disengagement of the clutch of a motor vehicle against the pressure of the clutch springs by the operation of the usual foot lever provided for the purpose generally places something of a burden upon the operator of the vehicle. This burden has been lightened to some extent by the use of engines of greater flexibility which has somewhat diminished the amount of gear shifting and clutch operation required, and by designing the clutch so that very little movement against the clutch springs is necessary to fully disengage the clutch, such design permitting the use of greater leverage for operating the clutch without lengthening the effective travel of the clutch lever. However, the extent to which it is possible to increase the flexibility of an engine adaptable for use in a motor vehicle is necessarily limited, and the extent to which the movement of the clutch against its springs to fully disengage the clutch is also limited. Consequently, in order that the clutch of a motor vehicle may be operated with the expenditure of less effort on the part of the operator than has heretofore been required, it is desirable to provide suitable means to automatically assist the operator in releasing the clutch.

One of the objects of the present invention is to provide means to automatically assist the operator in releasing the clutch of a motor vehicle.

Another object of the invention is to provide means tending to operate but not sufficient to release the clutch at all times except when the clutch is engaged.

Another object of the invention is to provide means tending to operate but not sufficient to release the clutch only after initial movement of the clutch operating means.

Another object of the invention is to provide means for automatically assisting in the release of the clutch of a motor vehicle, such means being substantially ineffective when the clutch is engaged so as not to counteract or diminish to any appreciable extent the engaging pressure of the clutch springs.

Figure 1:
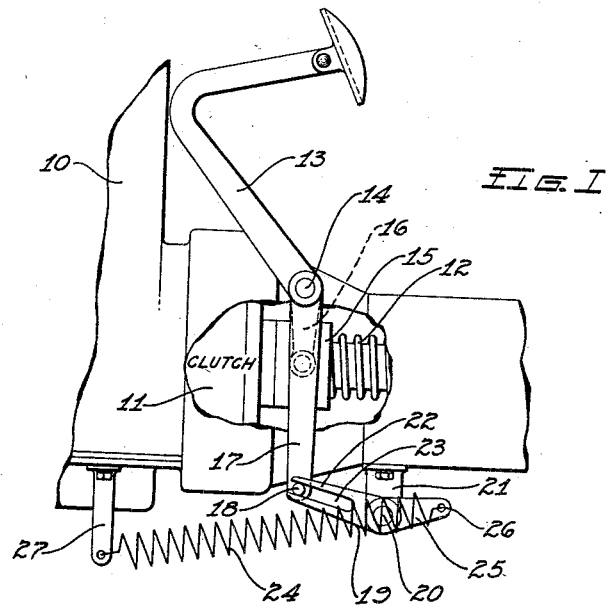
Figure 2:
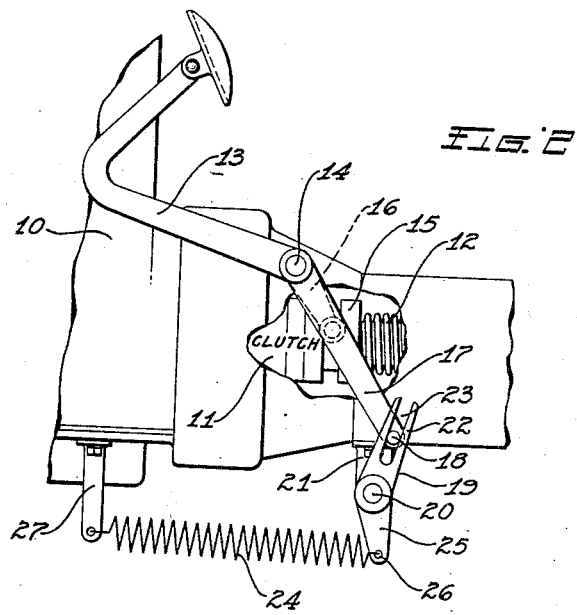

Other objects of the invention will appear from the following description taken in connection with the drawings forming a part of this specification, in which:

Fig. 1 is a side elevation of a part of a motor vehicle showing the clutch and other adjacent parts, embodying the invention, the clutch being in engaged position, and Fig. 2 is a view similar to Fig. 1 with the clutch in disengaged position.

Referring to the drawings, 10 represents an internal combustion engine having associated therewith a clutch 11, the clutch being of any desired type for connecting the motor crank shaft with the transmission or gear box of the vehicle. The clutch is shown as having a spring 12 adapted to normally engage the clutch friction parts and a clutch lever or pedal 13 is pivotally mounted as at 14 and connected with a collar 15 through a shifter fork 16 for operating the clutch or moving it to its disengaged or open position, this movement taking place against the action of spring 12. The upper end of lever 13 is positioned so that it may be conveniently engaged and operated by the foot of the operator of the vehicle.

An arm 17 preferably forming an extension of clutch lever 13 has mounted near its outer end a pin 18. A lever 19 pivotally mounted as at 20, on a bracket 21 or otherwise, has an arm 22 provided with a slot 23 adapted to receive pin 18 mounted on arm 17. A spring 24, preferably a relatively long coil spring, has one end connected to lever 19 in any suitable manner, but preferably adjacent the outer end of an arm 25 as shown, this end of the spring passing through an aperture 26 in arm 25. The other end of spring 24 is anchored in any convenient manner such as to a bracket 27 mounted on the frame or engine of the vehicle, and this end is so positioned with respect to lever 19 and its pivot 20 that when the clutch is engaged, the center line or axis of the spring will substantially align with the center line or axis of arm 25 of lever 19 as shown in Fig. 1.

From the foregoing, it will be seen that with the clutch in engaged position, the spring 24 will exert little or no force on lever 13 tending to disengage the clutch because of its substantially dead center position or because the center line or axis of the spring is substantially in alignment with the axis of arm 25 of lever 19. In this position, spring 24 exerts substantially a direct pressure on pivot 20, normal thereto, and exerts little or no force on the lever 19 tending to rotate it about pivot 20. However, after an initial or very small movement of clutch operating lever 13 from its fully retracted position as shown in Fig. 1, this movement being preferably just sufficient to take up the clearance between the fully retracted position of the clutch lever and the beginning of the clutch releasing movement, lever 19 will be moved slightly and spring 24 will be moved from its substantially dead center position. Thereafter, spring 24 will exert a force on lever 19 tending to rotate that lever and thereby exert a pressure on the clutch operating lever that will assist the operator of the vehicle in releasing the clutch. When the clutch is again engaged, spring 24 will be returned to its substantially dead center position as shown in Fig. 1 and thus will not counteract or diminish to any appreciable extent the full engaging pressure of the clutch springs.

Spring 24 is preferably sufficiently long so that the difference in the lengths of the spring in the engaged and disengaged positions of the clutch will result in no appreciable difference in the pressure exerted by the spring on lever 19 in these positions, although it will be apparent that as lever 19 is rotated as the clutch is disengaged, the total force exerted by spring 24 on the lever 19 will be increased due to the increase in length of the force arm or the distance between the axis of the spring and the pivot 20 and normal to the spring axis. With this arrangement, the maximum force is exerted by spring 24 when the clutch is in fully disengaged position. It will be understood that spring 24 is preferably only of sufficient strength to merely have a tendency to operate the clutch and will never be strong enough to actually release or disengage the clutch. In other words, the spring 24 acting through lever 19 merely assists the operator of the vehicle in the operation of releasing the clutch.

It will be understood that various forms of the invention other than those described above may be used without departing from the spirit or scope of the invention.

Having thus described the invention, what is claimed and desired to be secured by Letters Patent is:

1. In a motor vehicle, in combination, a clutch, a spring exerting a force to normally engage the clutch, a pair of slidably associated levers, one of said levers being connected to operate the clutch, and a coil spring associated with the other lever and arranged to oppose the force exerted by the other spring after initial movement of said levers to disengage the clutch.

2. In a motor vehicle, in combination, a a clutch, a spring exerting a force normally engaging the clutch, a pair of conjoined pivotally mounted levers, one of said levers being connected to operate the clutch, and a coil spring associated with the other lever in a manner to counteract the pressure of the clutch spring after initial movement of said levers to disengage the clutch.

3. In a motor vehicle, in combination, a clutch, a spring exerting pressure for engaging the clutch, a lever for operating the clutch and carrying a pin, a second lever having a slot to receive the pin, and yielding means associated with the second lever to partially oppose the engaging action of the clutch spring after initial movement of the clutch operating lever when disengaging the clutch.

4. In a motor vehicle, in combination, a clutch, a spring associated to normally cause engagement of the clutch, a pivoted lever for disengaging the clutch, a pin at the lower end of said lever, a second lever having a slot in one end thereof, said second lever being pivoted to receive the pin in the slotted portion thereof, and a coil spring connected to the second lever to exert a force thereagainst opposed to the force exerted by the clutch operating spring after initial movement of the clutch operating lever when disengaging the clutch.

5. In a motor vehicle, in combination, a clutch, a clutch engaging spring, clutch disengaging means, and yielding means opposing the engaging spring throughout the major portion of its movement and assisting the disengaging means after initial movement thereof towards clutch disengagement position, said yielding means consisting of a pivoted lever having a slotted connection to the clutch disengaging means, and a spring connected between said lever and a point fixed with respect to its pivot.

In testimony whereof I affix my signature.

MILTON TIBBETTS.